(12) United States Patent
Oo (10) Patent No.: US 12,103,078 B2
(45) Date of Patent: Oct. 1, 2024

(54) VARIABLE BUILD PLATE ADDITIVE MANUFACTURING

(71) Applicant: RTX Corporation, Farmington, CT (US)

(72) Inventor: Guolin Oo, Singapore (SG)

(73) Assignee: RTX CORPORATION, Farmington, CT (US)

( * ) Notice: Subject to any disclaimer, the term of this patent is extended or adjusted under 35 U.S.C. 154(b) by 14 days.

(21) Appl. No.: 17/711,235

(22) Filed: Apr. 1, 2022

(65) Prior Publication Data
US 2022/0331872 A1 Oct. 20, 2022

(30) Foreign Application Priority Data
Apr. 16, 2021 (SG) .............. 10202103914U (51) Int. Cl.
| | |
|---|---|
| B22F 12/33 | (2021.01) |
| B22F 10/28 | (2021.01) |
| B22F 10/37 | (2021.01) |
| B22F 12/00 | (2021.01) |
| B22F 12/30 | (2021.01) |
| B22F 12/37 | (2021.01) |
| B22F 12/53 | (2021.01) |
| B22F 12/90 | (2021.01) |

(Continued)

(52) U.S. Cl.
CPC .............. *B22F 10/37* (2021.01); *B22F 10/28* (2021.01); *B22F 12/222* (2021.01); *B22F 12/226* (2021.01); *B22F 12/30* (2021.01); *B22F 12/37* (2021.01); *B22F 12/53* (2021.01); *B22F 12/90* (2021.01); *B33Y 10/00* (2014.12); *B33Y 30/00* (2014.12)

(58) Field of Classification Search
CPC ........................................ B22F 12/33
See application file for complete search history.

(56) References Cited

U.S. PATENT DOCUMENTS

| | | | |
|---|---|---|---|
| 9,067,360 | B2 | 6/2015 | Wehning et al. |
| 10,245,822 | B2 | 4/2019 | El-Siblani |
| 2019/0358755 | A1 | 11/2019 | Ott |

(Continued)

FOREIGN PATENT DOCUMENTS

EP 3689504 A1 8/2020

OTHER PUBLICATIONS

European Search Report for European Application No. 22167195.1; Application Filing Date: Apr. 7, 2022; Date of Search: Sep. 8, 2022; 7 pages.

*Primary Examiner* — Christopher S Kessler
(74) *Attorney, Agent, or Firm* — CANTOR COLBURN LLP (57) ABSTRACT

Disclosed herein is an additive manufacturing system that includes an energy source, a powder supply, and a build chamber. The build chamber includes a base plate and two or more variable build plates coupled to the base plate. The two or more variable build plates each have one or more adjustable features. The two or more variable build plates are configurable to position two or more parts at different heights relative to a top level of the build chamber. The additive manufacturing system also includes a control system configured to control the energy source to fuse material from the powder supply to at least one of the two or more parts while the two or more parts are respectively positioned by the two or more variable build plates at different heights relative to the top level of the build chamber.

18 Claims, 10 Drawing Sheets

(51) Int. Cl.
*B33Y 10/00* (2015.01)
*B33Y 30/00* (2015.01)

(56) References Cited

U.S. PATENT DOCUMENTS

| | | |
|---|---|---|
| 2020/0238380 A1 | 7/2020 | Worthing, Jr. et al. |
| 2020/0238381 A1 | 7/2020 | Shi et al. |
| 2020/0238382 A1 | 7/2020 | Shi et al. |
| 2020/0238383 A1 | 7/2020 | Shi et al. |
| 2020/0238387 A1 | 7/2020 | Shi et al. |
| 2020/0238447 A1 | 7/2020 | Fedyk et al. |

VARIABLE BUILD PLATE ADDITIVE MANUFACTURING

CROSS-REFERENCE TO RELATED APPLICATIONS

This application claims the benefit of Singapore Application No.: 10202103914U, filed Apr. 16, 2021, the disclosure of which is incorporated herein by reference in its entirety.

BACKGROUND

Exemplary embodiments of the present disclosure pertain to the art of metal additive manufacturing, and more particularly to variable build plate additive manufacturing.

Traditional additive manufacturing systems include, for example, Additive Layer Manufacturing (ALM) devices, such as Direct Metal Laser Sintering (DMLS), Selective Laser Melting (SLM), Laser Beam Melting (LBM) and Electron Beam Melting (EBM) that provide for the fabrication of complex metal, alloy, polymer, ceramic and composite structures by the freeform construction of the workpiece, layer-by-layer. The principle behind additive manufacturing processes involves the selective melting of atomized precursor powder beds by a directed energy source, producing the lithographic build-up of the workpiece. The melting of the powder occurs in a small localized region of the energy beam, producing small volumes of melting, called melt pools, followed by rapid solidification, allowing for very precise control of the solidification process in the layer-by-layer fabrication of the workpiece. An example of a particular type of system is a PBF-L (powder bed fusion-laser) additive system where the energy beam is a laser.

The laser in a PBF-L system is typically focused by a lens, then deflected by a mirror so that the energy beam selectively impinges on a powder bed. In operation, the powder is melted at the laser focus site on the build surface or substrate. Precursor powder is either gravitationally fed from cassettes or loaded by a piston so that it can be raked onto a build table. The excess powder is raked off and collected for re-application. Since the laser is typically fixed, when additive manufacturing techniques are used in a repair or restoration operation, a single part may be processed at a time. Batch processing of multiple parts typically involves machining the parts down to a lowest common part dimension shared by the batch of parts and then adding to all of the parts, layer-by-layer, collectively to rebuild and restore the parts as a group.

BRIEF DESCRIPTION

Disclosed is an additive manufacturing system that includes an energy source, a powder supply, and a build chamber. The build chamber includes a base plate and two or more variable build plates coupled to the base plate. The two or more variable build plates each have one or more adjustable features. The two or more variable build plates are configurable to position two or more parts at different heights relative to a top level of the build chamber. The additive manufacturing system also includes a control system configured to control the energy source to fuse material from the powder supply to at least one of the two or more parts while the two or more parts are respectively positioned by the two or more variable build plates at different heights relative to the top level of the build chamber.

In addition to one or more of the features described above, or as an alternative to any of the foregoing embodiments, the additive manufacturing system can include a measurement system configured to determine a height of the two or more parts.

In addition to one or more of the features described above, or as an alternative to any of the foregoing embodiments, the control system can be configured to adjust at least one of the two or more variable build plates based on the height of the two or more parts.

In addition to one or more of the features described above, or as an alternative to any of the foregoing embodiments, adjustment of the at least one of the two or more variable build plates can include aligning a build region of the two or more parts level with respect to the top level of the build chamber.

In addition to one or more of the features described above, or as an alternative to any of the foregoing embodiments, the control system can be configured to adjust the base plate relative to the top level of the build chamber after a new layer of material is fused to the build region of the two or more parts.

In addition to one or more of the features described above, or as an alternative to any of the foregoing embodiments, the one or more adjustable features of the two or more variable build plates can include one or more of a telescopic shaft, a ball and socket joint, and a multi-axis robotic actuation system.

In addition to one or more of the features described above, or as an alternative to any of the foregoing embodiments, the base plate can include a conveyor and a spring-loaded cover, and the spring-loaded cover can be configured to isolate powder in the build chamber from the conveyor.

In addition to one or more of the features described above, or as an alternative to any of the foregoing embodiments, the control system can be configured to modify an orientation of at least one of the two or more parts such that a different build surface orientation is used for adding one or more layers of material to the two or more parts in parallel.

In addition to one or more of the features described above, or as an alternative to any of the foregoing embodiments, the additive manufacturing system can include a powder spray unit, and the control system can be configured to selectively apply powder to at least one of the two or more parts using the powder spray unit.

In addition to one or more of the features described above, or as an alternative to any of the foregoing embodiments, the control system can be configured to independently control a height and part orientation for each of the two or more variable build plates.

Also disclosed is a method for additive manufacturing. The method includes positioning two or more parts at different heights relative to a top level of a build chamber, the two or more parts respectively attached to two or more variable build plates coupled to a base plate, where the two or more variable build plates each have one or more adjustable features. An energy source is controlled to fuse material from a powder supply to at least one of the two or more parts while the two or more parts are respectively positioned by the two or more variable build plates at different heights relative to the top level of the build chamber.

In addition to one or more of the features described above, or as an alternative to any of the foregoing embodiments, the method can include using a measurement system to determine a height of the two or more parts.

In addition to one or more of the features described above, or as an alternative to any of the foregoing embodiments, the method can include adjusting at least one of the two or more variable build plates based on the height of the two or more parts.

In addition to one or more of the features described above, or as an alternative to any of the foregoing embodiments, adjusting the at least one of the two or more variable build plates can include aligning a build region of the two or more parts level with respect to the top level of the build chamber.

In addition to one or more of the features described above, or as an alternative to any of the foregoing embodiments, the method can include adjusting the base plate relative to the top level of the build chamber after a new layer of material is fused to the build region of the two or more parts.

In addition to one or more of the features described above, or as an alternative to any of the foregoing embodiments, the method can include modifying an orientation of at least one of the two or more parts such that a different build surface orientation is used for adding one or more layers of material to the two or more parts in parallel.

In addition to one or more of the features described above, or as an alternative to any of the foregoing embodiments, the method can include applying powder selectively to at least one of the two or more parts using a powder spray unit.

In addition to one or more of the features described above, or as an alternative to any of the foregoing embodiments, the method can include independently controlling a height and part orientation for each of the two or more variable build plates.

A technical effect of the apparatus, systems and methods is achieved by performing variable build plate additive manufacturing as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Additive manufacturing has resulted in metal parts with decreased weight, added functionality and new design possibilities. Deposition method parameters may be selected to yield a desired average grain size. In some embodiments the average grain size is varied by location. In some embodiments the average grain size is consistent throughout. The thickness of the deposited layer can vary depending on the deposition method and desired average grain size.

When directed energy deposition is used, laser power, toolpath speed, and layer thickness can be selected to yield the desired average grain size and layer thickness. In general, lower laser power and slower toolpath speed results in a smaller average grain size and higher laser power and faster toolpath speed results in a larger average grain size.

Exemplary metals used in additive manufacturing can include nickel, cobalt, copper, titanium, aluminum, iron, alloys including one or more of the foregoing metals, and combinations thereof. Exemplary alloys can include Iconel 718, Iconel 625, stainless steel, Waspaloy and IN100. Metal powder particle size and particle size distribution in powder can be determined by one of skill in the art.

Additive manufacturing can be used to build new parts or to repair damaged parts. One example provided herein is with respect to part repair and restoration for a gas turbine engine. Other types of parts may be similarly processed for different types of machines and systems. Gas turbine engines typically include rotating components in a fan section, a compressor section, and a turbine section. The turbine section can include a series of blades and vanes, to harness energy from the combustion within the core of the engine. Due to the high operating temperature and rotating speed of the turbine section, turbine blades undergo extreme stress conditions throughout the engine cycles. The wear of blade tips may vary across each of the blades at engine-run conditions. The blades can be repaired accordingly during engine shop visits. Repairs of the turbine blades can include tip weld build-up performed using manual welding or a laser cladding process. During the repair process, splatter may occur occasionally leading to additional rework or scrap.

Selective laser sintering/melting in a powder bed can be used to perform tip weld build-up. The powder-bed fusion method allows for batch processing of multiple parts within the build volume. There is typically a need to machine the parts to similar dimensions prior to loading onto a build plate for laser repair, which allows levelling of powder material during each iteration. Rather than machining parts to similar dimensions, embodiments as described further herein include a method of repairing parts, such as turbine blades, using powder bed additive manufacturing, where differences between the parts can be accommodated using variable build plates. In addition to powder bed technology, where iterations of powder layering and laser power source use to melt/sinter the powder particles onto the parts, the build plates where the individual parts are loaded can be adjusted to account for the various dimensional differences, such as blade lengths variation. This can create a uniform level across the blade tips to be welded prior to selective laser melting/sintering. The dimensions to which the respective parts are adjusted to can be determined via manual measurements or assisted measurements with devices such as a laser gauge, probe, or camera vision. After determining any adjustments, the variable build plates can be moved accordingly. A main build plate (or all the variable build plates) can be actuated consistently downwards for subsequent layering of powder materials for a repair process.

Figure 1:
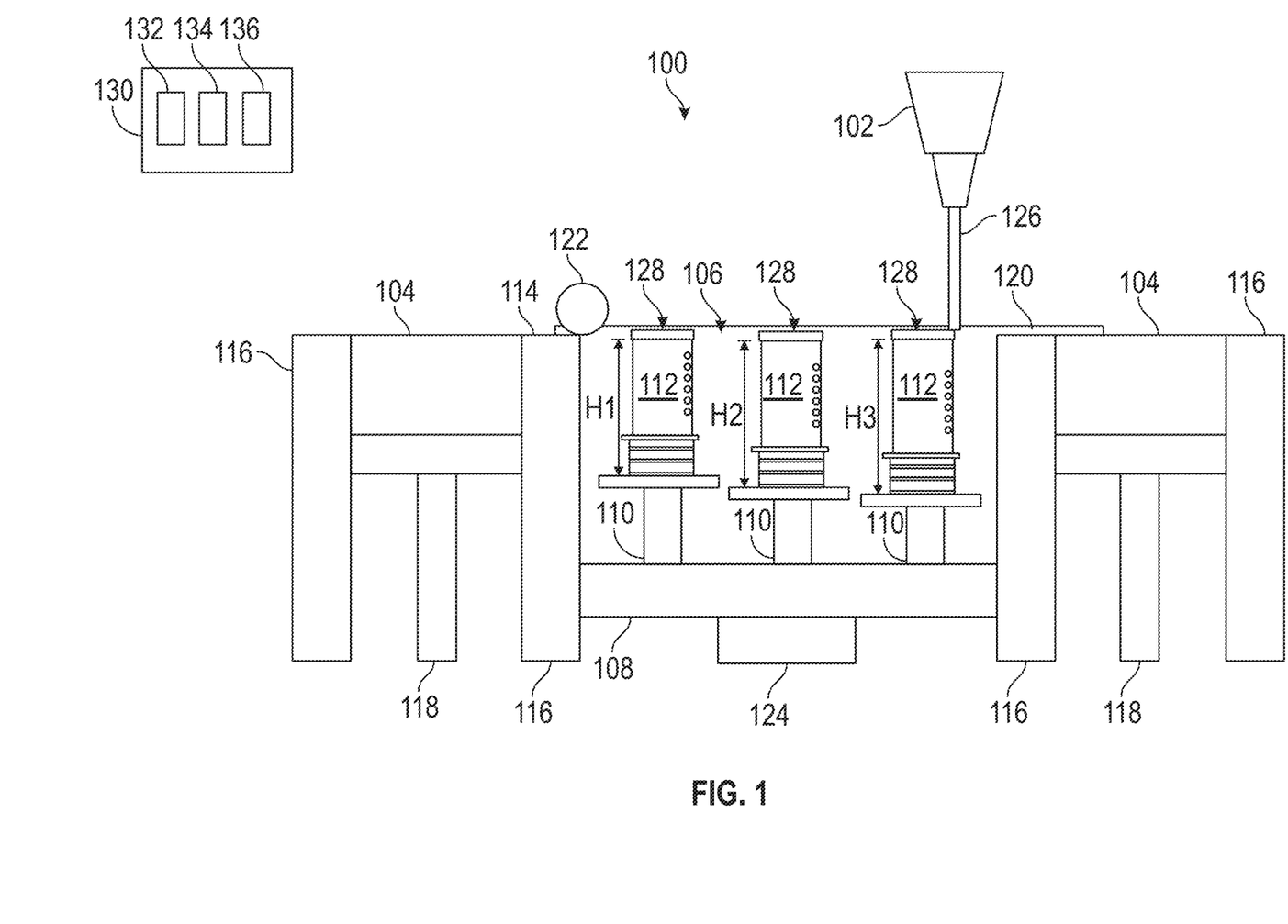
FIG. 1 is a schematic view of an additive manufacturing system according to an embodiment.

FIG. 1 shows a schematic view of an additive manufacturing system 100 according to an embodiment. The additive manufacturing system 100 includes an energy source 102, a powder supply 104, and a build chamber 106. The build chamber 106 includes a base plate 108 (e.g., a main build plate) and two or more variable build plates 110 coupled to the base plate 108. The two or more variable build plates 110 each have one or more adjustable features, such as telescoping/adjustable height settings. The two or more variable build plates 110 are configurable to position two or more parts 112 at different heights (e.g., H1, H2, H3) relative to a top level 114 of the build chamber 106. The top level 114 may be defined by one or more side walls 116, where one or more actuators 118 can urge powder material 120 from the powder supply 104 above the top level 114 and into the build chamber 106. A roller 122 or other such mechanism can level and move the powder material 120 from the powder supply 104 to the build chamber 106. The positioning of the parts 112 relative to the top level 114 can be adjusted by individually adjusting the height of the variable build plates 110 or by repositioning the base plate 108. Base plate 108 movement can be driven by an actuator 124, such as a lift or conveyor mechanism.

The additive manufacturing system 100 also includes a control system 130 configured to control the energy source 102 to fuse the powder material 120 from the powder supply 104 to at least one of the two or more parts 112 while the two or more parts 112 are respectively positioned by the two or more variable build plates 110 at different heights relative to the top level 114 of the build chamber 106. As one example, the energy source 102 can emit a laser 126 responsive to the control system 130 to form a new layer 128 of material fused on an uppermost level of the parts 112.

The control system 130 can include a processing system 132 and a memory system 134, where the memory system 134 stores executable instructions to configure the processing system 132 to perform a plurality of operations. The processing system 132 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 134 can store data and instructions that are executed by the processing system 132. In embodiments, the memory system 134 may include random access memory (RAM), read only memory (ROM), or other electronic, optical, magnetic, or any other computer readable medium onto which is stored data and algorithms in a non-transitory form. The control system 130 can also include an input/output (I/O) interface 136 operable to interface with various components of the additive manufacturing system 100 to sense, control, and communicate with components of FIG. 1 and other components (not depicted), such as a user interface.

Figure 2:
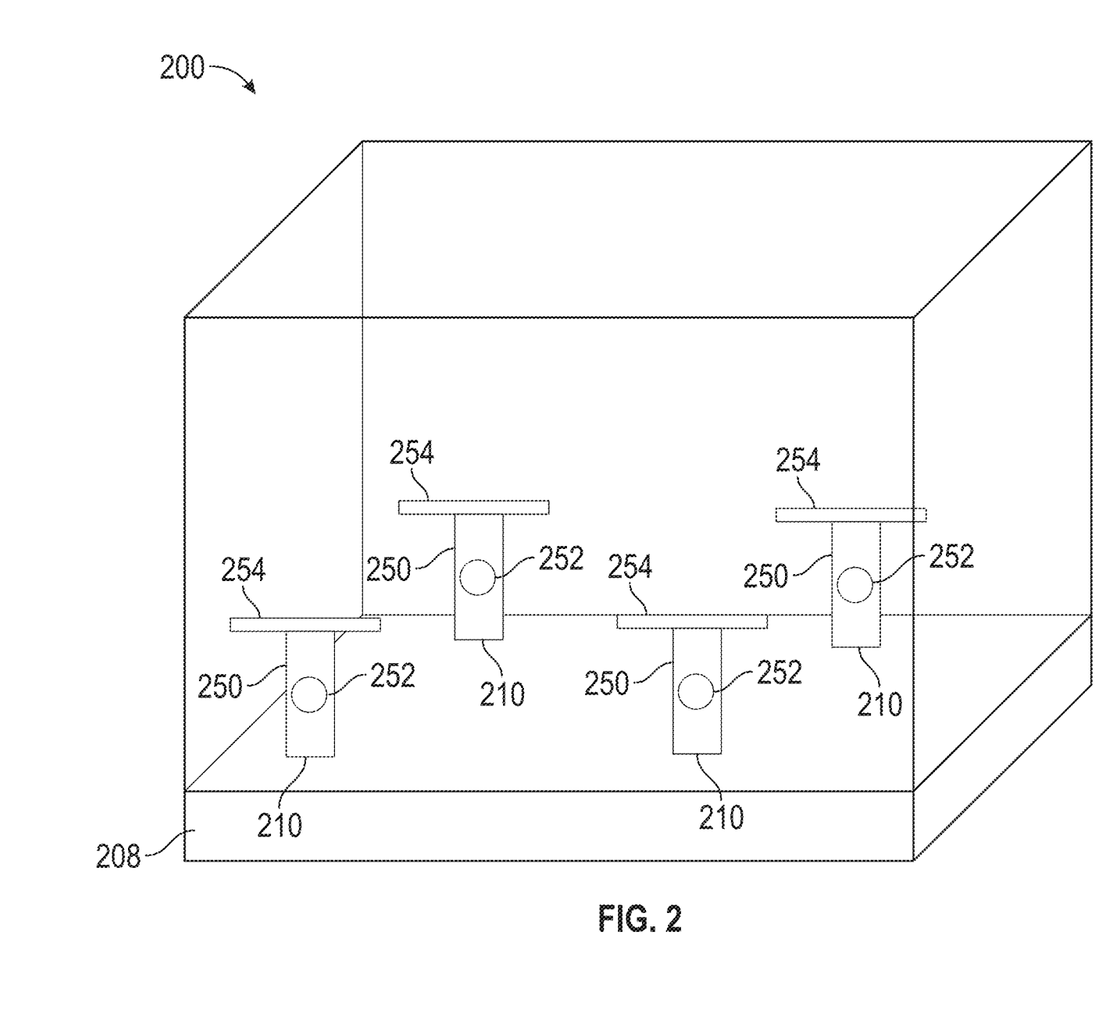
FIG. 2 is a perspective view of a build chamber of an additive manufacturing system that includes multiple variable build plates according to an embodiment.

FIG. 2 is a perspective view of a build chamber 200 of an additive manufacturing system, such as the additive manufacturing system 100 of FIG. 1, that includes multiple variable build plates 210 according to an embodiment. The variable build plates 210 can be offset in the x-axis and y-axis directions relative to a surface of a base plate 208. In the example of FIG. 2, each of the variable build plates 210 in the build chamber 200 can include one or more adjustable features, such as a telescopic shaft 250 and/or a ball and socket joint 252. The variable build plates 210 each also include a build platform 254 that can support attachment of a fixture and/or part, such as the parts 112 of FIG. 1.

Figure 3:
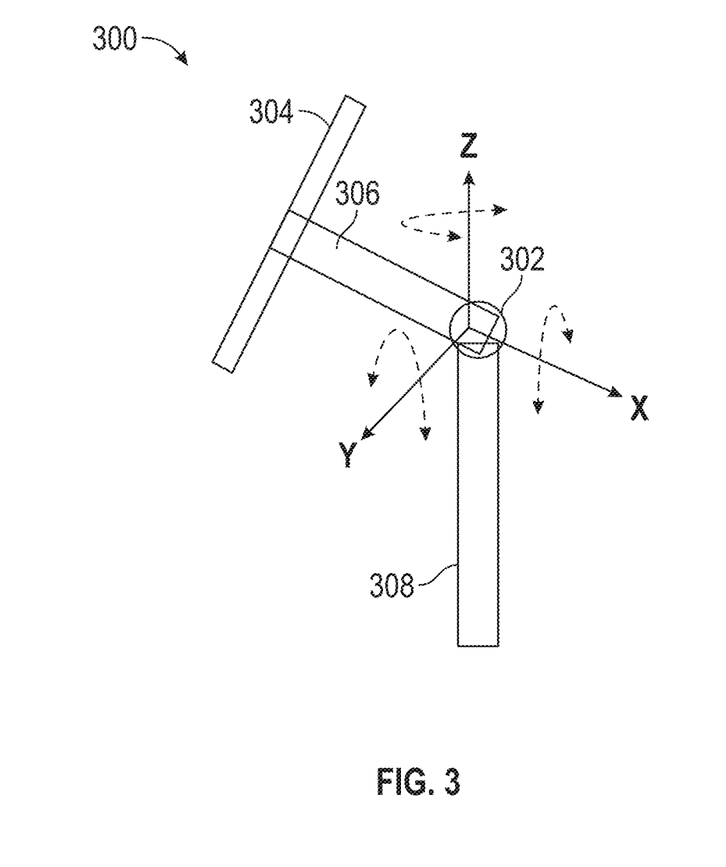
FIG. 3 is a schematic view of a variable build plate with a ball and socket joint according to an embodiment.

FIG. 3 is a schematic view of a variable build plate 300 with a ball and socket joint 302 according to an embodiment. The variable build plate 300 can be used in the example of FIGS. 1 and 2 to further control position and orientation of the parts 112. For example, the ball and socket joint 302 can modify the position and orientation of build platform 304 in the x/y/z axis, where an upper portion 306 moves relative to a lower portion 308 of the variable build plate 300. Further, either or both of the upper portion 306 and lower portion 308 of the variable build plate 300 can be telescoping shafts to adjust the height/offset of the build platform 304 relative to another structure.

Figure 4:
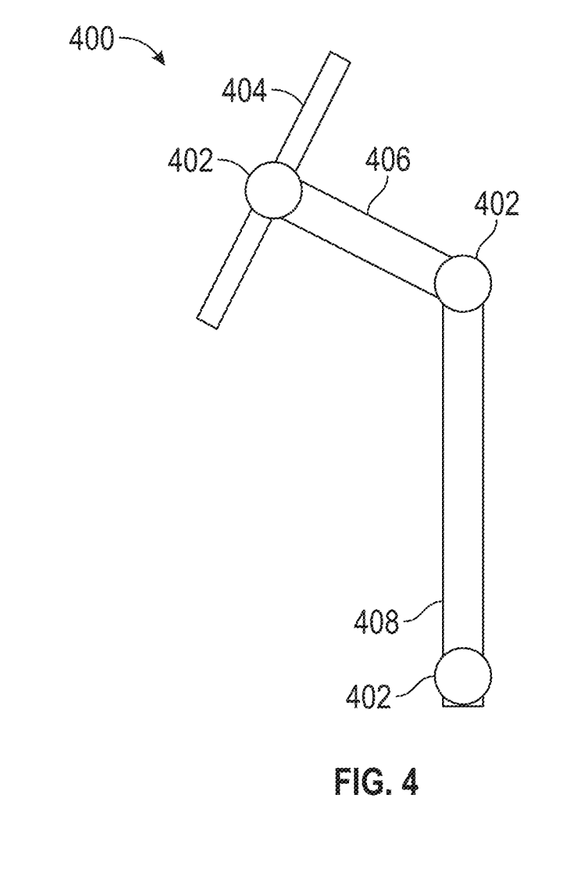
FIG. 4 is a schematic view of a variable build plate with a multi-axis robotic actuation system capability according to an embodiment.

FIG. 4 is a schematic view of a variable build plate 400 with a multi-axis robotic actuation system capability according to an embodiment. The variable build plate 400 can be used in the example of FIGS. 1 and 2 to further control position and orientation of the parts 112. For example, robotic joints 402 can modify the position and orientation of build platform 404 in the x/y/z axis, where an upper portion 406 moves relative to a lower portion 408 of the variable build plate 400. Further, either or both of the upper portion 406 and lower portion 408 of the variable build plate 400 can be telescoping shafts to adjust the height/offset of the build platform 404 relative to another structure. The increased number of robotic joints 402 as compared to the ball and socket joint 302 of FIG. 3 can further enhance orientation options for more complex repair operations.

Figure 5:
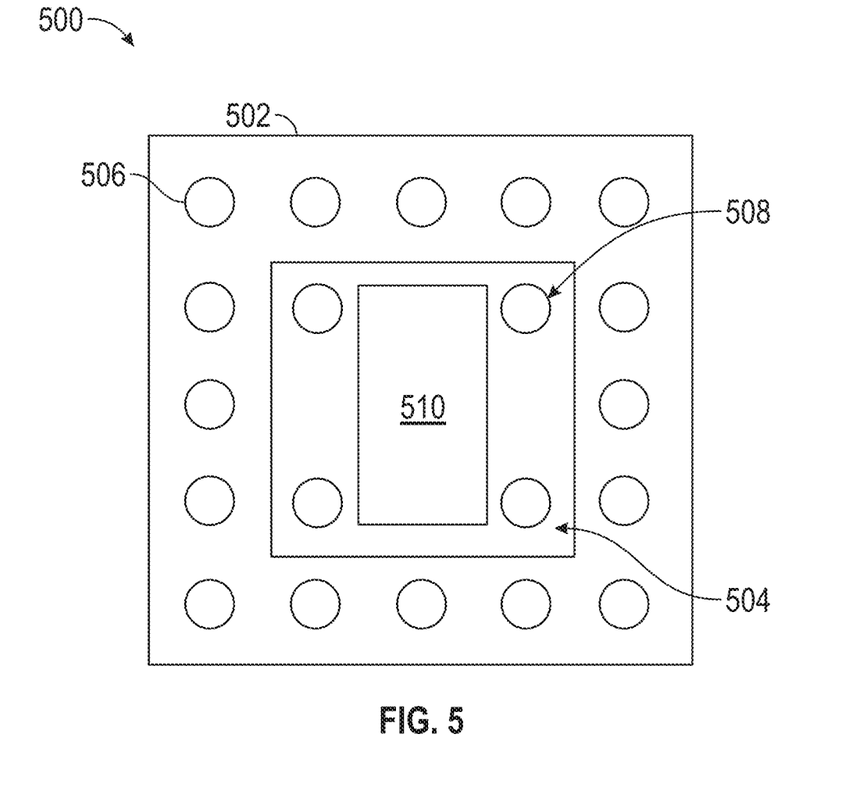
FIG. 5 is a top view of a through-hole configuration of a build platform of a variable build plate having a fixture coupled thereto according to an embodiment.
Figure 6:
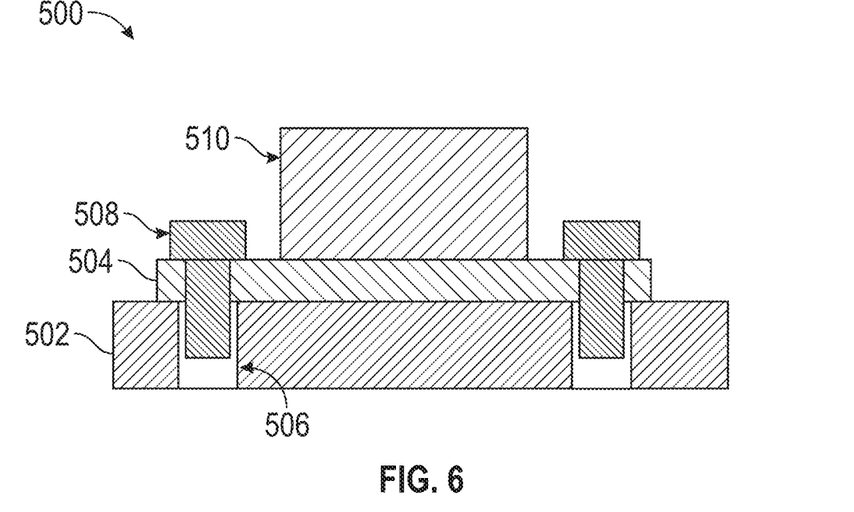
FIG. 6 is a sectional view of the build platform of the variable build plate and fixture coupled thereto of FIG. 5 according to an embodiment.

FIG. 5 is a top view of a through-hole configuration 500 of a build platform 502 of a variable build plate having a fixture 504 coupled thereto according to an embodiment. In the example of FIG. 5, the through-hole configuration 500 includes a plurality of through-holes 506 through which coupling elements 508, such as locking pins or screws, can be inserted to attach the fixture 504 to the build platform 502. The fixture 504 can include a part coupling interface 510, which may have clamps, screws, suction, etc. interfaces to hold the parts 112 of FIG. 1 in place during an additive manufacturing process. FIG. 6 is a sectional view of the build platform 502 of a variable build plate and fixture 504 coupled thereto of FIG. 5 according to an embodiment. The build platform 502 can be used in the example of FIGS. 1 and 2 to further control position and orientation of the parts 112.

Figure 7:
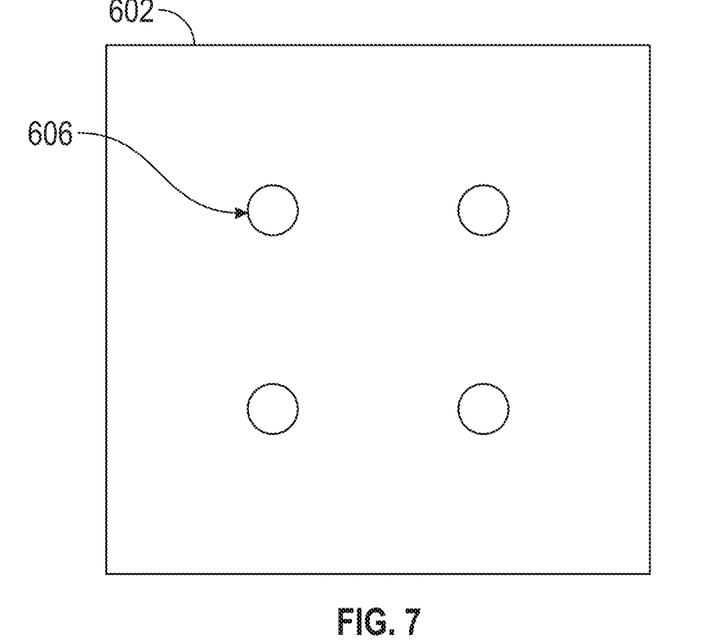
FIG. 7 is a top view of a surface-mount configuration of a build platform of a variable build plate according to an embodiment.

FIG. 7 is a top view of a surface-mount configuration 600 of a build platform 602 of a variable build plate according to an embodiment. The surface-mount configuration 600 can include a plurality of magnetic couplers 606 that support surface mounting of a fixture 604 using magnetic aligners 608. The fixture 604 can include a part coupling interface 610, which may have clamps, screws, suction, etc. interfaces to hold the parts 112 of FIG. 1 in place during an additive manufacturing process, as illustrated in FIGS. 8 and 9.

Figure 8:
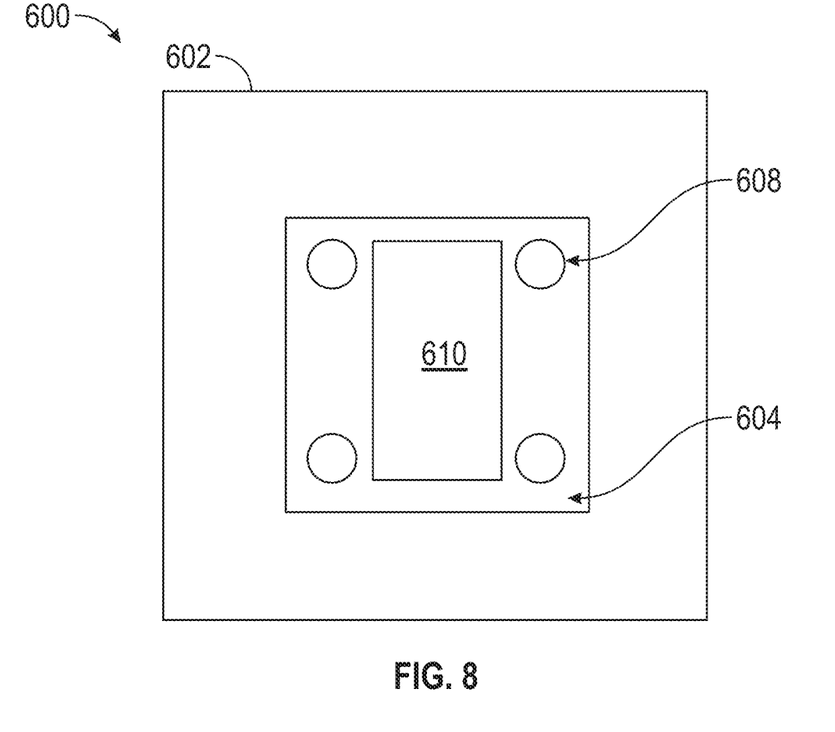
FIG. 8 is a top view of a surface-mount configuration of a build platform of a variable build plate having a fixture coupled thereto according to an embodiment.
Figure 9:
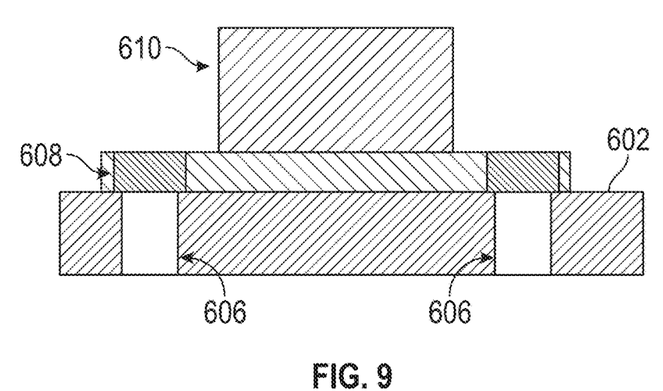
FIG. 9 is a sectional view of the build platform of the variable build plate and fixture coupled thereto of FIG. 8 according to an embodiment.

FIG. 8 is a top view of the surface-mount configuration 600 of the build platform 602 of a variable build plate having a fixture 604 coupled thereto according to an embodiment. FIG. 9 is a sectional view of the build platform 602 of the variable build plate and fixture 604 coupled thereto of FIG. 8 according to an embodiment.

Figure 10:
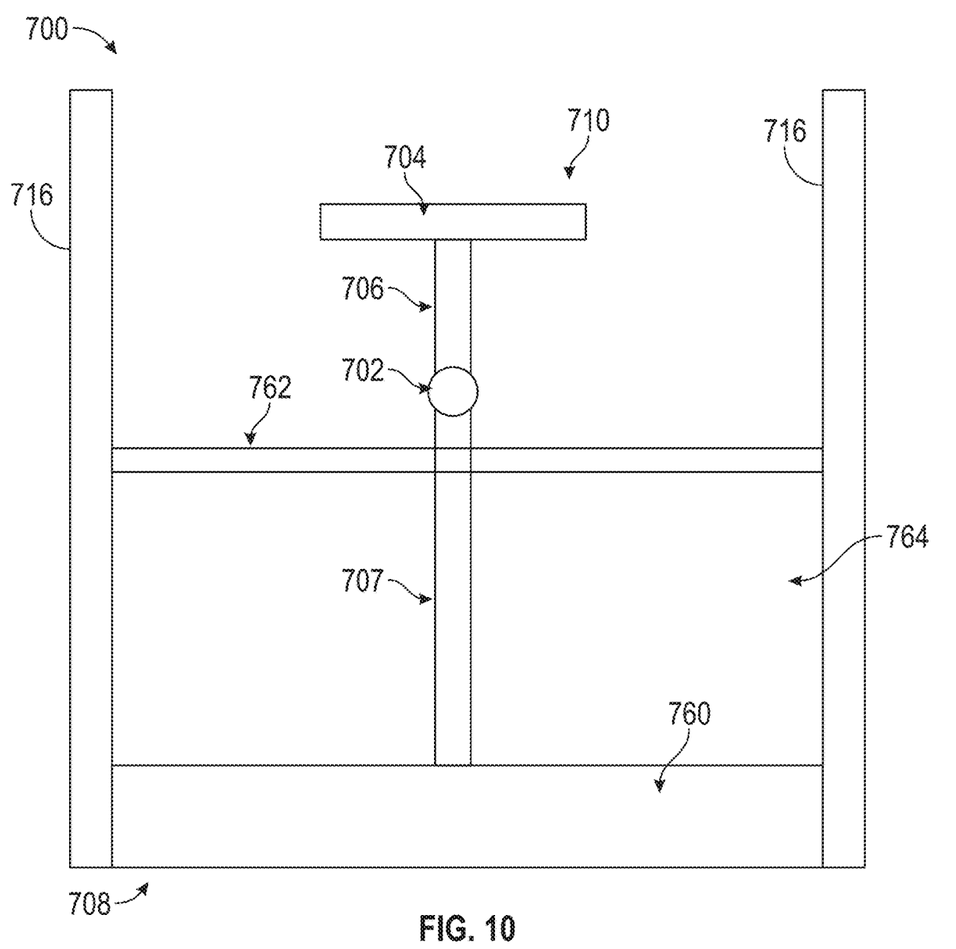
FIG. 10 is a sectional view of a build chamber including a base plate with a conveyor and a spring-loaded cover according to an embodiment.

FIG. 10 is a sectional view of build chamber 700 including a base plate 708 with a conveyor 760 and a spring-loaded cover 762 according to an embodiment. The elements of base plate 708 can be incorporated into any of the base plates described with respect to other figures. The build chamber 700 can include one or more variable build plates 710. The build chamber 700 can be established between two or more side walls 716. The spring-loaded cover 762 can move relative to the one or more variable build plates 710. The one or more variable build plates 710 can each include at least one joint 702, an upper portion 706 that moves relative to a lower portion 707, and a build platform 704. The conveyor 760 can adjust the position of the lower portion 707, for example, in an x-y axis direction of movement. The lower portion 707 and/or upper portion 706 may also extend, retract, or otherwise move to alter the position of the build platform 704. The spring-loaded cover 762 can be configured to isolate powder in the build chamber 700 from the conveyor 760 such that powder material is substantially prevented from entering the space 764 between the conveyor 760 and spring-loaded cover 762 during additive manufacturing processes.

Figure 11:
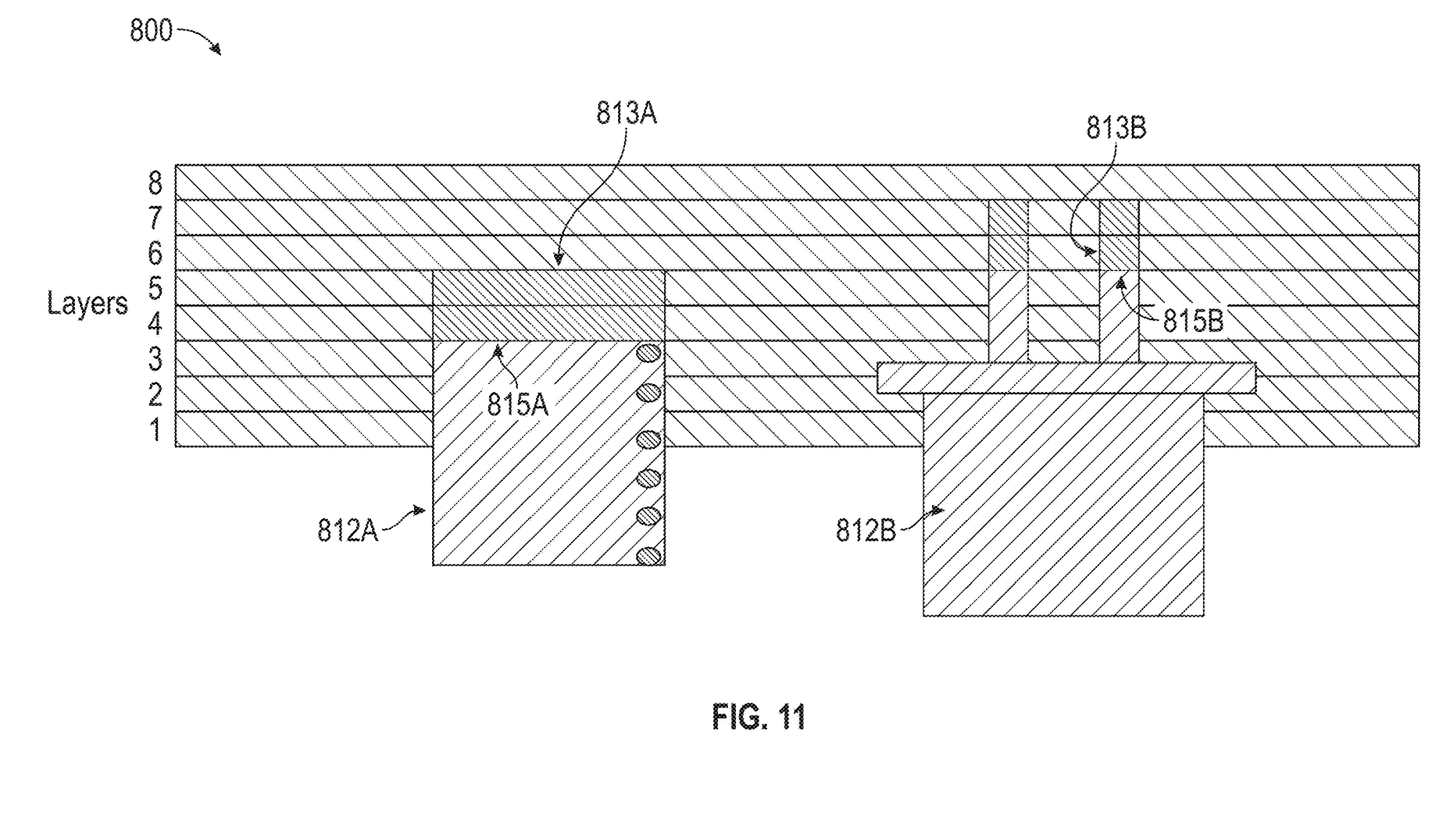
FIG. 11 is a schematic view of layers added to two parts according to an embodiment.

FIG. 11 is a schematic view of layers 800 added to two parts 812A, 812B according to an embodiment. Layers 800 can be defined in a range between 1 and 8, for example, to determine where new layers 813A, 813B should be fused to build regions 815A, 815B of the parts 812A, 812B respectively. As depicted in the example of FIG. 11, there can be multiple new layers 813A, 813B added to each of the parts 812A, 812B using an iterative build process. In some embodiments, the build regions 815A, 815B of the parts 812A, 812B are aligned to the same layers 800 by adjusting the height of one or more variable build plates. In other embodiments, the control system 130 of FIG. 1 can be programmed to add layers 800 to each of the parts 812A, 812B as needed.

Figure 12:
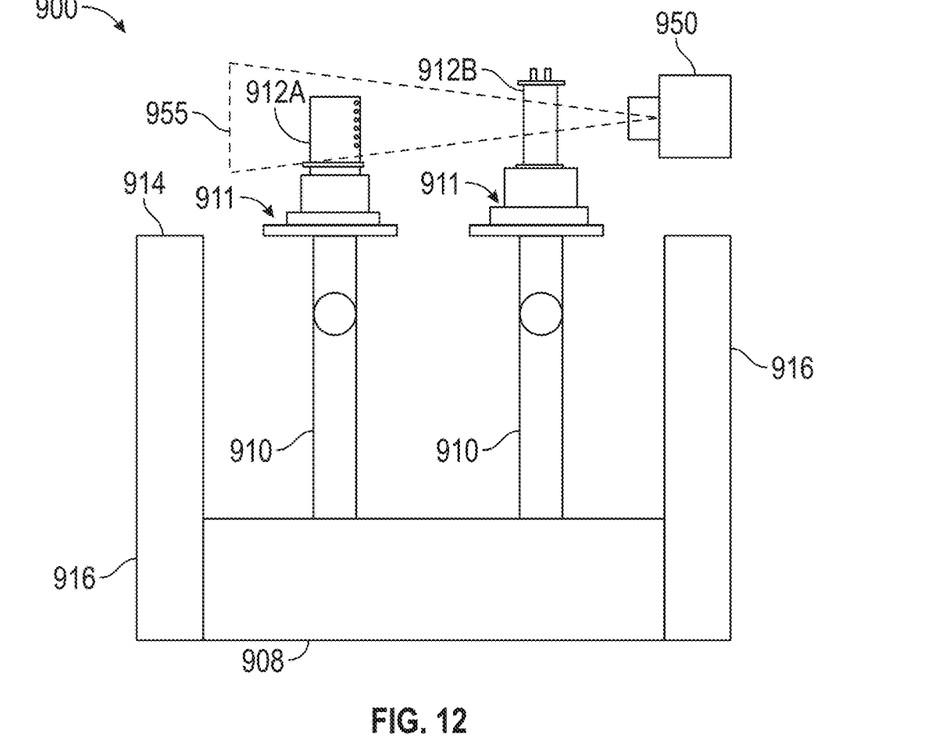
FIG. 12 is a schematic view of a build chamber with a measurement system according to an embodiment.

FIG. 12 is a schematic view of build chamber 900 with a measurement system 950 according to an embodiment. The measurement system 950 can be used to scan dimensions of parts 912A, 912B. The measurement system 950 can include a camera, scanning laser, probe, and/or other such devices known in the art to capture dimensional details of the parts 912A, 912B. The measurement system 950 can interface with a control system, such as the control system 130 of FIG. 1. In some embodiments, imaging data acquired within a field of view 955 of the measurement system 950 can be used to identify the parts 912A, 912B, for instance, using a part identification database and/or machine learning techniques. Alternatively, the parts 912A, 912B may already by identified through other means, such as an operator manually entering identification information, bar code scanning, quick response (QR) code scanning, radio-frequency identification (RFID) scanning, or other such techniques. Detail information about the dimensional requirements of the parts 912A, 912B ensures that potential complex geometries, such as airfoils, are properly formed during the additive manufacturing build process.

Figure 13:
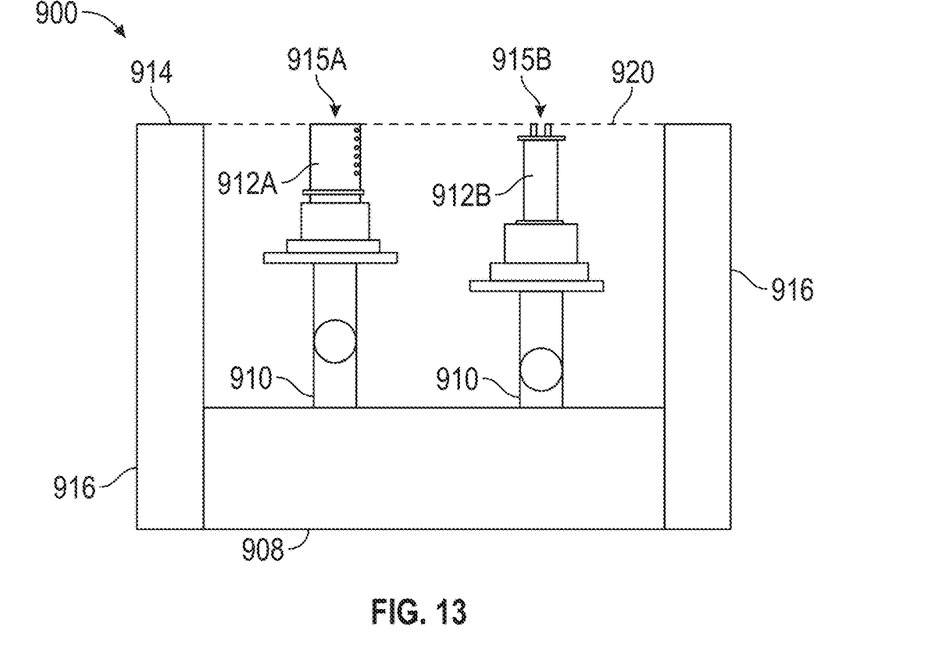
FIG. 13 is a schematic view of a build chamber with two parts respectively positioned by the two or more variable build plates at different heights relative to the top level of the build chamber according to an embodiment.

Positioning of the measurement system 950 and/or the parts 912A, 912B can be adjusted during a scanning process to acquire dimensional details. In the example of FIG. 12, each of the parts 912A, 912B is coupled respectively to a variable build plate 910 and held in place by a coupling fixture 911. The variable build plates 910 can be any of the configurations as previously described with respect to FIGS. 1-10. The coupling fixture 911 can include elements such as those previously described with respect to FIGS. 5-9. The variable build plates 910 and/or a portion of base plate 908 can be actuated to elevate the parts 912A, 912B above the top level 914 of the side walls 916 for inspection by the measurement system 950. Once sufficient dimensional details have been determined, the parts 912A, 912B are lowered below the top level 914 of the side walls 916, as depicted in FIG. 13. Where the parts 912A, 912B have different heights, each of the variable build plates 910 is separately adjusted such that build regions 915A, 915B of the parts 912A, 912B are aligned level 920 with respect to the top level 914 of the build chamber 900. As new layers are fused onto the build regions 915A, 915B, the variable build plates 910 and/or a portion of base plate 908 can be progressively lowered to re-align the top of the new layers level 920 with respect to the top level 914 of the build chamber 900.

Figure 14:
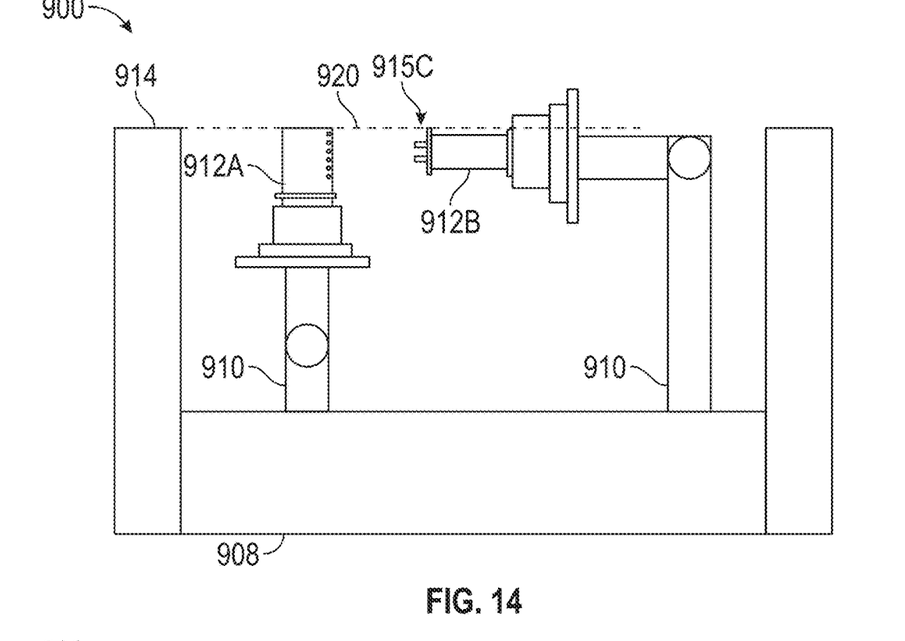
FIG. 14 is a schematic view of a build chamber with two parts respectively positioned with different orientations according to an embodiment.
Figure 15:
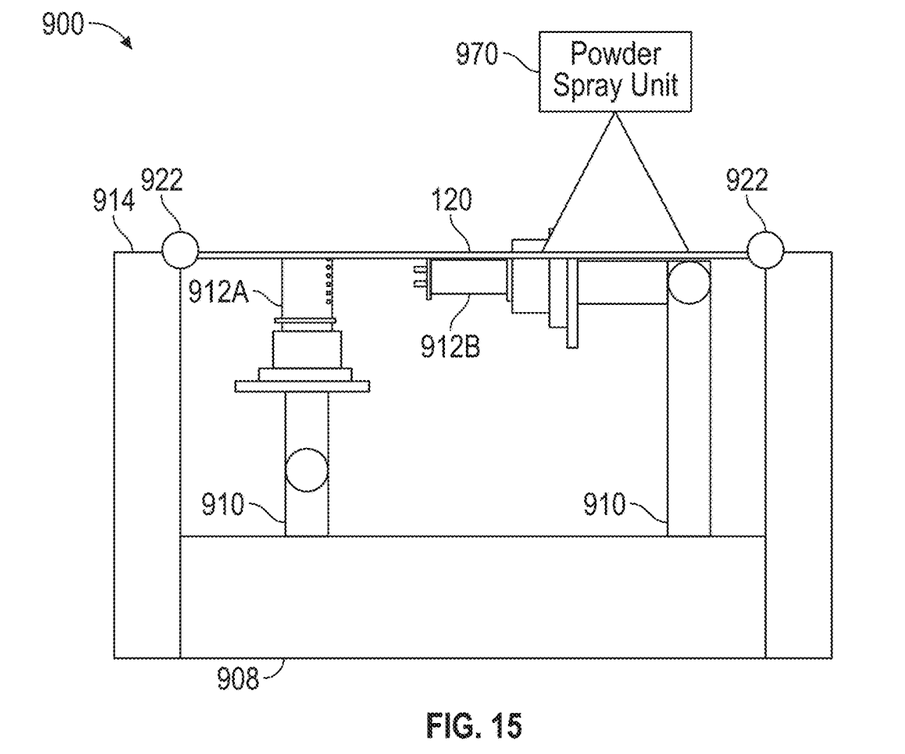
FIG. 15 is a schematic view of a build chamber with a powder spray unit configured to selectively apply powder according to an embodiment.

In embodiments, the variable build plates 910 can be controlled, for example, by the control system 130 of FIG. 1 to independently control a height and part orientation for each of the variable build plates 910. For example, as depicted in FIG. 14, a portion of the variable build plate 910 holding part 912B can be rotated relative to the base plate 908 and positioned such that a different build region 915C is aligned level 920 with the top level 914 of the build chamber 900. Where such a change in orientation results in gaps in placement of power material 120 such that leveling rollers 922 cannot directly reach the gaps, a powder spray unit 970 can be used to selectively apply powder to at least one of the parts 912B as depicted in the example of FIG. 15.

Figure 16:
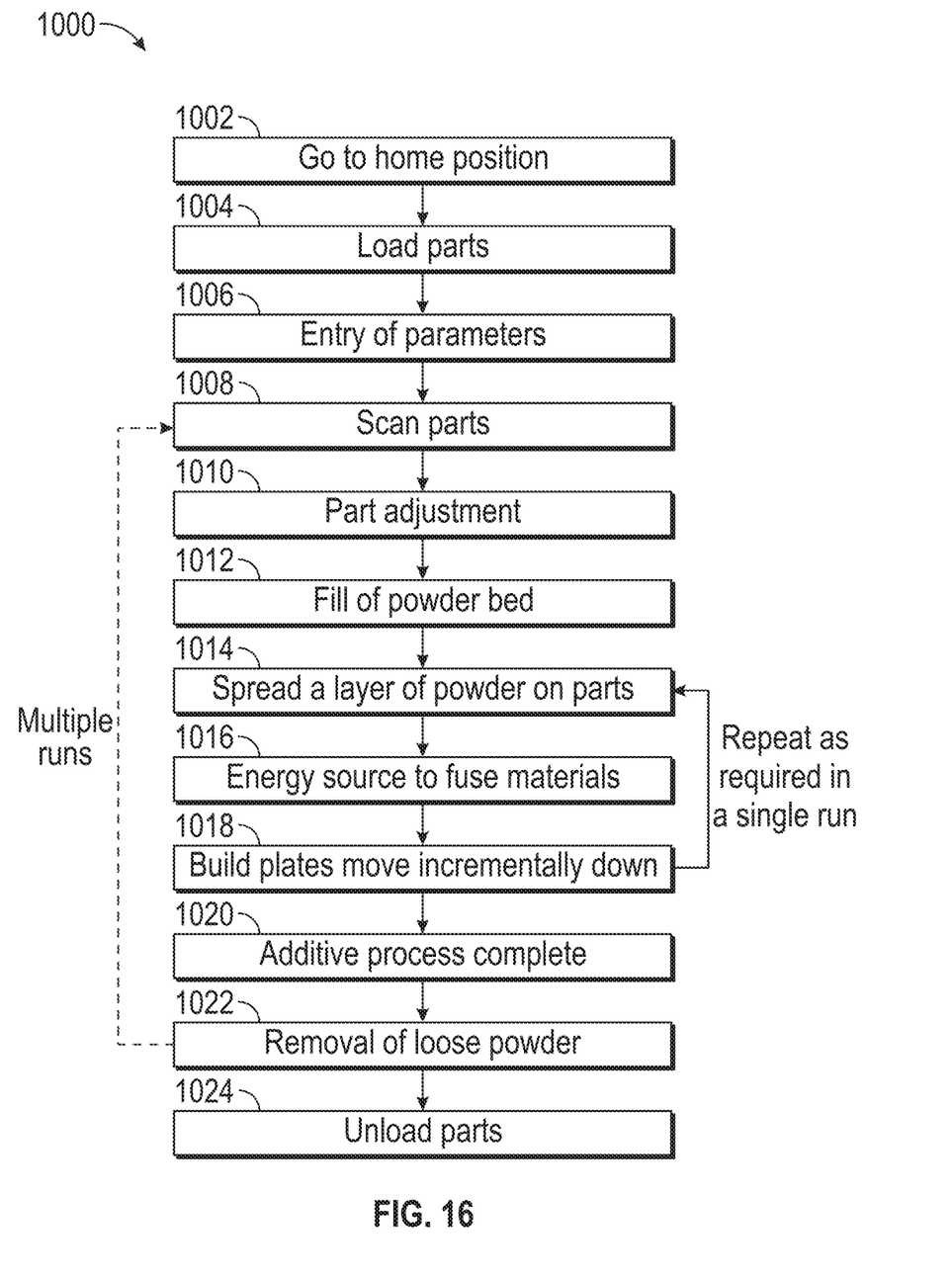
FIG. 16 is a process flow according to an embodiment.

Turning to FIG. 16, a flowchart shows a method 1000 for additive manufacturing according to an embodiment. The method 1000 of FIG. 16 is described with respect to FIGS. 1-16 and may include additional steps beyond those depicted in FIG. 16. The method 1000 can be controlled by a control system, such as the control system 130 of FIG. 1. Some portions of the method 1000 can be manually performed depending on the amount of automation available. The method 1000 is described primarily in reference to the additive manufacturing system 100 of FIG. 1 for purposes of explanation, although it will be understood that any of the components previously described can be used depending upon the system configuration.

At block 1002, a "go to home position" command can be issued to reset all moveable elements to a known starting position and orientation, such as setting adjustable features of the variable build plates 110 to a predetermined starting state. At block 1004, two or more parts 112 are loaded into the additive manufacturing system 100, where each part 112 is coupled to a separate variable build plate 110. At block 1006, parameter entry can be performed manually or through a data acquisition process to inform the control system 130 about known details of the parts 112, such as a part type (e.g., turbine blade type and stage identifier, compressor blade type and stage identifier, fan blade type identifier, vane type identifier, etc.).

At block 1008, the parts 112 may be scanned, for example, using the measurement system 950 to determine the current dimensions of the parts 112. Based on determining the current dimensions, and using known desired dimensional information based on identifying the parts, at block 1010, the parts 112 can be adjusted within the build chamber 106 to orient a build region of the parts 112 with respect to the top level 114 of the build chamber 106, for example, by controlling one or more adjustable features of the variable build plates 110.

At block 1012, the powder bed area of the build chamber 106 where the parts 112 are located is filled with powder material 120 from the powder supply 104. At block 1014, one or more roller 122 can be controlled to spread a layer of the powder material 120 on the parts 112. A powder spray unit 970 can be used to supplement spreading of the powder material 120 as needed. At block 1016, the control system 130 can control the energy source 102 to fuse a layer of the powder material 120 to each of the parts 112 according to the known positioning and dimensional requirements of each of the parts 112. As layers are fused, the variable build plates 110 can be incrementally adjusted to move the parts 112 lower to support building of subsequent layers on the parts 112 at block 1018. Blocks 1014, 1016, and 1018 are repeated as needed to build multiple layers.

At block 1020, the additive process can be considered complete if the processed parts 112 meet the desired dimensions. The measurement system 950 can be used to inspect the parts 112 to confirm a successful build. At block 1022, loose powder is removed from the parts 112 and the build chamber 106. At block 1024, the completed parts 112 can be unloaded. Where multiple runs are needed to build/repair the parts 112, rather than unloading the parts 112, the parts 112 can be scanned again at block 1008 to build features at a different orientation.

In summary, additive manufacturing for multiple parts 112 simultaneously can be performed by positioning two or more parts 112 at different heights (e.g., H1, H2, H3) relative to a top level 114 of a build chamber 106, where the two or more parts 112 are respectively attached to two or more variable build plates 110 coupled to a base plate 108, and the two or more variable build plates 110 each have one or more adjustable features (e.g., height and/or pivot adjustments). Controlling an energy source 102 can fuse material from a powder supply 104 to at least one of the two or more parts 112 while the two or more parts 112 are respectively positioned by the two or more variable build plates 110 at different heights relative to the top level 114 of the build chamber 106. A measurement system 950 can be used to determine a height of the two or more parts 112. At least one of the two or more variable build plates 110 can be adjusted based on the height of the two or more parts 112. Adjusting at least one of the two or more variable build plates 110 can include aligning a build region of the two or more parts 112 level with respect to the top level 114 of the build chamber 106. The control system 130 can be configured to adjust the base plate 108 and/or variable build plates 110 relative to the top level 114 of the build chamber 106 after a new layer of material is fused to the build region of the two or more parts 112. One or more adjustable features of the two or more variable build plates 110 can include one or more of a telescopic shaft, a ball and socket joint, and a multi-axis robotic actuation system. The control system 130 can be configured to independently control a height and part orientation for each of the two or more variable build plates 110. The base plate 108 can include a conveyor and a spring-loaded cover, where the spring-loaded cover is configured to isolate powder in the build chamber 106 from the conveyor. The control system 130 can also be configured to modify an orientation of at least one of the two or more parts 112 such that a different build surface orientation is used for adding one or more layers of material to the two or more parts 112 in parallel. The control system 130 can also be configured to selectively apply powder to at least one of the two or more parts 112 using the powder spray unit 970.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An additive manufacturing system comprising:
    an energy source;
    a powder supply;
    a build chamber comprising:
        a base plate; and
        two or more variable build plates coupled to the base plate, the two or more variable build plates each having one or more adjustable features, the two or more variable build plates configurable to position two or more parts at different heights relative to a top level of the build chamber; and
    a control system configured to control the energy source to fuse material from the powder supply to at least one of the two or more parts while the two or more parts are respectively positioned by the two or more variable build plates at different heights relative to the top level of the build chamber, wherein the control system is configured to modify an orientation of at least one of the two or more parts such that a different build surface orientation is used for adding one or more layers of material to the two or more parts in parallel.

2. The additive manufacturing system of claim 1, further comprising a measurement system configured to determine a height of the two or more parts.

3. The additive manufacturing system of claim 2, wherein the control system is configured to adjust at least one of the two or more variable build plates based on the height of the two or more parts.

4. The additive manufacturing system of claim 3, wherein adjustment of the at least one of the two or more variable build plates comprises aligning a build region of the two or more parts level with respect to the top level of the build chamber.

5. The additive manufacturing system of claim 4, wherein the control system is configured to adjust the base plate relative to the top level of the build chamber after a new layer of material is fused to the build region of the two or more parts.

6. The additive manufacturing system of claim 1, wherein the one or more adjustable features of the two or more variable build plates comprise one or more of a telescopic shaft, a ball and socket joint, and a multi-axis robotic actuation system.

7. The additive manufacturing system of claim 1, wherein the base plate comprises a conveyor and a spring-loaded cover, and the spring-loaded cover is configured to isolate powder in the build chamber from the conveyor.

8. The additive manufacturing system of claim 1, further comprising a powder spray unit, wherein the control system is configured to selectively apply powder to at least one of the two or more parts using the powder spray unit.

9. The additive manufacturing system of claim 1, wherein the control system is configured to independently control a height and part orientation for each of the two or more variable build plates.

10. A method for additive manufacturing, the method comprising:
  positioning, by a control system, two or more parts at different heights relative to a top level of a build chamber, the two or more parts respectively attached to two or more variable build plates coupled to a base plate, wherein the two or more variable build plates each have one or more adjustable features, wherein the control system is configured to modify an orientation of at least one of the two or more parts such that a different build surface orientation is used for adding one or more layers of material to the two or more parts in parallel; and
  controlling an energy source to fuse material from a powder supply to at least one of the two or more parts while the two or more parts are respectively positioned by the two or more variable build plates at different heights relative to the top level of the build chamber.

11. The method of claim 10, further comprising:
  using a measurement system to determine a height of the two or more parts.

12. The method of claim 11, further comprising:
  adjusting at least one of the two or more variable build plates based on the height of the two or more parts.

13. The method of claim 12, wherein adjusting the at least one of the two or more variable build plates comprises aligning a build region of the two or more parts level with respect to the top level of the build chamber.

14. The method of claim 13, further comprising:
  adjusting the base plate relative to the top level of the build chamber after a new layer of material is fused to the build region of the two or more parts.

15. The method of claim 10, wherein the one or more adjustable features of the two or more variable build plates comprise one or more of a telescopic shaft, a ball and socket joint, and a multi-axis robotic actuation system.

16. The method of claim 10, wherein the base plate comprises a conveyor and a spring-loaded cover, and the spring-loaded cover is configured to isolate powder in the build chamber from the conveyor.

17. The method of claim 10, further comprising:
  applying powder selectively to at least one of the two or more parts using a powder spray unit.

18. The method of claim 10, further comprising:
  independently controlling a height and part orientation for each of the two or more variable build plates.

* * * * *